US008504986B2

(12) United States Patent
Schneider

(10) Patent No.: US 8,504,986 B2
(45) Date of Patent: Aug. 6, 2013

(54) CALLING FUNCTIONS AS METHODS

(75) Inventor: James P. Schneider, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 1172 days.

(21) Appl. No.: 12/018,378

(22) Filed: Jan. 23, 2008

(65) Prior Publication Data
US 2009/0187885 A1    Jul. 23, 2009

(51) Int. Cl.
*G06F 9/44*    (2006.01)
*G06F 9/45*    (2006.01)

(52) U.S. Cl.
USPC ............ 717/114; 717/115; 717/116; 717/139

(58) Field of Classification Search
None
See application file for complete search history.

(56) References Cited

U.S. PATENT DOCUMENTS

| | | | | |
|---|---|---|---|---|
| 5,210,876 | A | * | 5/1993 | Uchida ........................ 717/139 |
| 6,085,198 | A | * | 7/2000 | Skinner et al. ........................ 1/1 |
| 6,175,956 | B1 | * | 1/2001 | Hicks et al. .................... 717/114 |
| 6,481,006 | B1 | * | 11/2002 | Blandy et al. ................. 717/139 |
| 6,523,171 | B1 | | 2/2003 | Dupuy et al. |
| 2003/0226132 | A1 | | 12/2003 | Tondreau et al. |
| 2004/0040011 | A1 | * | 2/2004 | Bosworth et al. ............. 717/114 |
| 2004/0054986 | A1 | * | 3/2004 | Dresselhaus et al. ......... 717/116 |
| 2005/0039173 | A1 | | 2/2005 | Tondreau et al. |
| 2006/0070028 | A1 | * | 3/2006 | Belov et al. .................... 717/114 |
| 2007/0168949 | A1 | * | 7/2007 | Shattuck et al. ............... 717/115 |
| 2008/0163167 | A1 | * | 7/2008 | Buzinov et al. ............... 717/115 |
| 2008/0307389 | A1 | | 12/2008 | Marchant |
| 2008/0307390 | A1 | | 12/2008 | Marchant |

OTHER PUBLICATIONS

Stein, L. CGI.pm-3.25. Nov. 15, 2006. [retrieved on Sep. 19, 2011]. Retrieved from the Internet: <URL: http://web.archive.org/web/20061115005401/http://search.cpan.org/~lds/CGI.pm-3.25/>.*
Wainright, P. Professional Perl. Nov. 12, 2006. [retrieved on Sep. 20, 2011]. Retrieved from the Internet: <URL:http://web.archive.org/web/20061112025232/http://www.webreference.com/programming/perl/professional/chap7/2/>.*
Fowler, M., et al., Refactoring: Improving the Design of Existing Code, Addison-Wesley, 2002, 14 pages, [retrieved on Mar. 5, 2012], Retrieved from the Internet: <URL:agilepractice.googlecode.com/files/Refactoring.pdf>.*
Butler, T., Class-OOorNO, CPAN, Nov. 3, 2004, 10 pages, [retrieved on Aug. 22, 2012], Retrieved from the Internet: <URL:http://web.archive.org/web/20041103083603/http://search.cpan.org/~tommy/Class-OOorNO-0.011/OOorNO.pod>.*
Stein, L., A DNA Sequence Class in Perl, Dr. Dobbs, Jun. 1, 1999, 9 pages, [retrieved on Mar. 28, 2013], Retrieved from the Internet: <URL:http://www.drdobbs.com/open-source/a-dna-sequence-class-in-perl/184410964>.*
Called as method or subroutine?, COMPGROUPS.NET, Jul. 27, 2003, 12 pages, [retrieved on Mar. 28, 2013], Retrieved from the Internet: <URL:http://compgroups.net/comp.lang.perl.misc/called-as-method-or-subroutine/374203>.*

(Continued)

*Primary Examiner* — Thuy Dao
*Assistant Examiner* — Geoffrey St Leger
(74) *Attorney, Agent, or Firm* — Lowenstein Sandler LLP

(57) ABSTRACT

A method and apparatus for converting a method call to a function call. In one embodiment, the method comprises receiving an argument list from a function that has been called by a subroutine call. The method further comprises determining whether the subroutine call is a method call from the argument list. In response to a determination that the subroutine call is the method call, the method comprises converting the method call into a function call.

12 Claims, 4 Drawing Sheets

OTHER PUBLICATIONS

Crow, Phil, "Symbol Table Manipulation", Perl.com http://www.perl.com/pub/a/2005/03/17/symtables.html, printed from Internet on Feb. 16, 2010, (Mar. 17, 2005), 6 pages.

Red Hat, Inc. U.S. Appl. No. 11/946,271, Non-Final Office Action mailed Jun. 21, 2011.

Red Hat, Inc. U.S. Appl. No. 11/946,271, Final Office Action mailed Dec. 7, 2011.

Schwartz, R., Perl Objects, References & Modules (Jun. 2003), O'Reilly Media, pp. 88-111, 126.

Wall, L.; Christiansen, T.; Orwant, J., "Programming Perl", 3rd Ed. (Jul. 2000), O'Reilly Media, pp. 1-1072.

Flanagan, D., "JavaScript: The Definitive Guide", 5th Ed. (Aug. 2006), O'Reilly Media, pp. 106-182.

Sinclair, R., "Checking if an Object Exists" (Jul. 1, 2003) [retrieved from http://www.codingforums.com/archive/index.php/t-22592.html on Jun. 13, 2011].

Perl.com "Jul. 2003 Archives," (Jul. 2003) [retrieved from http://www.perl.com/pub/2003/07/ on Jun. 13, 2011].

Swartz, F., "Commentary: Return Statements and the Single Exit Fantasy" (Oct. 7, 2006) [retrieved from http://www.leepoint.net/JavaBasics/methods-commentary/methcom-30-multiple-return.html on Jun. 13, 2011].

Fra3K, "Code Improvement Guidelines," (Jul. 5, 2005) [retrieved from http://jroller.com/fra3k/entry/code_improvement-guidelines on Jun. 13, 2011].

Cross, D., "Overloading Perl Objects", 9 pages, Jul. 22, 2003, http://mag-sol.com/articles/overload.html.

* cited by examiner

```
# The deobjectification function
sub DeObjectify
{
    # Grab the information of the caller
    my (@call_info) = caller(1);                           ← 320

# Trim the caller name to just its name
    # Removes everything up to and including the last "::"
    $caller_info(3) =~ s/.*:://;

# Conditionally remove the first argument, if necessary
    shift @_ if UNIVERSAL::can($_[0], $caller_info[3]);     ← 330

# Return the original arguments, possibly with the object removed
    return @_;
}
```
← 300

```
sub foo
{
    my @args = DeObjectify(@_);
}
```
← 310

FIG. 3

CALLING FUNCTIONS AS METHODS

CROSS-REFERENCE TO RELATED APPLICATIONS

The present invention is related to patent application Ser. No. 11/946,271, entitled "Automatic Object Instantiation," which was filed on Nov. 28, 2007.

TECHNICAL FIELD

Embodiments of the present invention relate to computer programmability, and more specifically, to a computer system on which subroutines can be called as methods or functions.

BACKGROUND

Some programming languages are purely procedural, others are purely object-oriented, and some are a hybrid. In a procedural language, such as C, every call is a function call. In an object-oriented language, such as Java, every call is a method call. In a hybrid language, such as Perl, Javascript, or Forth, a call can be either a function call or a method call.

Suppose a software library is written in a hybrid language. The software library includes a plurality of library subroutines, which are written in a style such that they have to be called as functions. These functions can be defined in one class, but can be imported into another class. For example, in Perl, functions can be imported from one package into another package, where a package defines the boundary of a class. A user working with a package that imports a function may be unaware of whether the function is intended to be used as a function or as a method. If a user creates code that calls the imported function as a method, the code will be successfully compiled, but will produce undesirable behaviors at runtime.

Conventionally, a subroutine has two implementations, one implementation as a function and another implementation as a method, to allow a user to call the subroutine as either a function or a method. Alternatively, a user has to modify the existing code to ensure that the library subroutines are called as functions. Therefore, there is a need to improve software usability and flexibility, such that the above-mentioned problem can be overcome.

BRIEF DESCRIPTION OF THE DRAWINGS

The present invention is illustrated by way of example, and not by way of limitation, in the figures of the accompanying drawings and in which:

FIG. 3 is an example of a Perl program that implements the process of FIG. 2.

DETAILED DESCRIPTION

Figure 1:
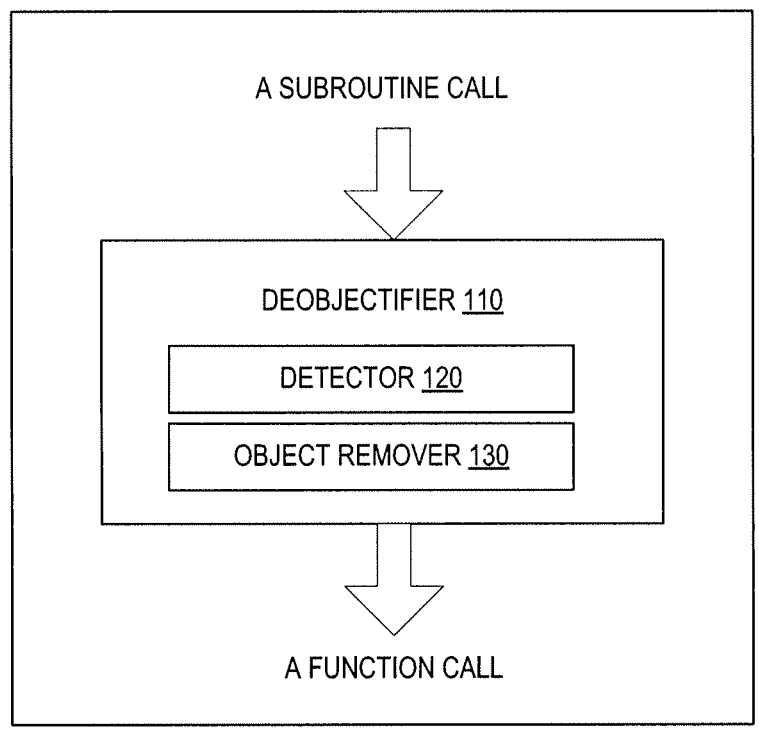
FIG. 1 illustrates a computing system in which an embodiment of a deobjectifier is implemented.

Described herein is a method and apparatus for converting a method call into a function call. In one embodiment, a function invokes a deobjectifier to ensure that the function is properly called. If the function is called as a method, the deobjectifier will convert the method call into a function call. If the function is called as a function, the deobjectifier performs no conversion. When the function is called as either a function or a method, an argument list is passed into the function. This argument list, or a portion thereof, is passed on to the deobjectifier. Given the argument list of the function, the deobjectifier determines whether a designated parameter slot (e.g., the first parameter) in the argument list is an object or a class on which the function can be called as a method. If the first parameter is such an object or a class, the deobjectifier removes the first parameter from the argument list. If the first parameter is not an object or a class, or does not allow the function to be called as a method, the deobjectifier returns the same argument list back to the function. Thus, the deobjectifier can be called by a function to allow the function to proceed as if it had been called as a function, irrespective of how the function was originally called.

The technique described herein improves software interoperability and flexibility. As mentioned above, object-oriented programming languages (e.g., Java), by design, disallow a function to be called as a method. However, in some hybrid programming languages, such as Perl, a function called as a method may be successfully compiled, but may produce undesirable behavior at runtime. The deobjectifier, as described herein, can be used to remove an object or a class in a designated slot of a method call and to transform the method call into a function call. The designated slot in Perl is the first parameter of the argument list. Thus, a function in a software library can call the deobjectifier to ensure that the function will execute properly. The deobjectifier is transparent to the user of the software library. Existing code can utilize the functions provided by the software library, whether the code was written to call the functions as functions or as methods. As a result, software interoperability and flexibility are greatly improved.

The technique described herein may also be applied to programming languages other than Perl, as long as the programming languages distinguish a function call from a method call by the existence of a particular object or class in a designated slot of the argument list of the call. The particular object or class is an object or a class on which the method can be called.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "receiving", "removing", "converting", "determining", "returning", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more a specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., carrier waves, infrared signals, digital signals, etc.)), etc.

FIG. 1 illustrates an embodiment of a deobjectifier 110 resident on a computing system 100. The computing system 100 may be, for example, a personal computer (PC), a file server, a mobile phone, a palm-sized computing device, a personal digital assistant (PDA), a networked computing device, and the like. The deobjectifier 110 may be implemented as a hardware circuit, as computer programs stored in a computer readable storage medium executable by the computing system 100, or a combination of both. An exemplary computing system storing an embodiment of the deobjectifier 110 will be described in greater detail with reference to FIG. 4.

In one embodiment, the deobjectifier 110 includes a detector 120 and a object remover 130. When the deobjectifier 110 is invoked by a function, the detector 120 determines whether the function has been called as a method. The detector 120 makes the determination by examining an argument list that is used to call the function, and is passed into the deobjectifier 110. If the detector 120 determines that the function has been called as a method, the object remover 130 removes an object or a class from the argument list from a designated slot in the argument list.

Figure 2:
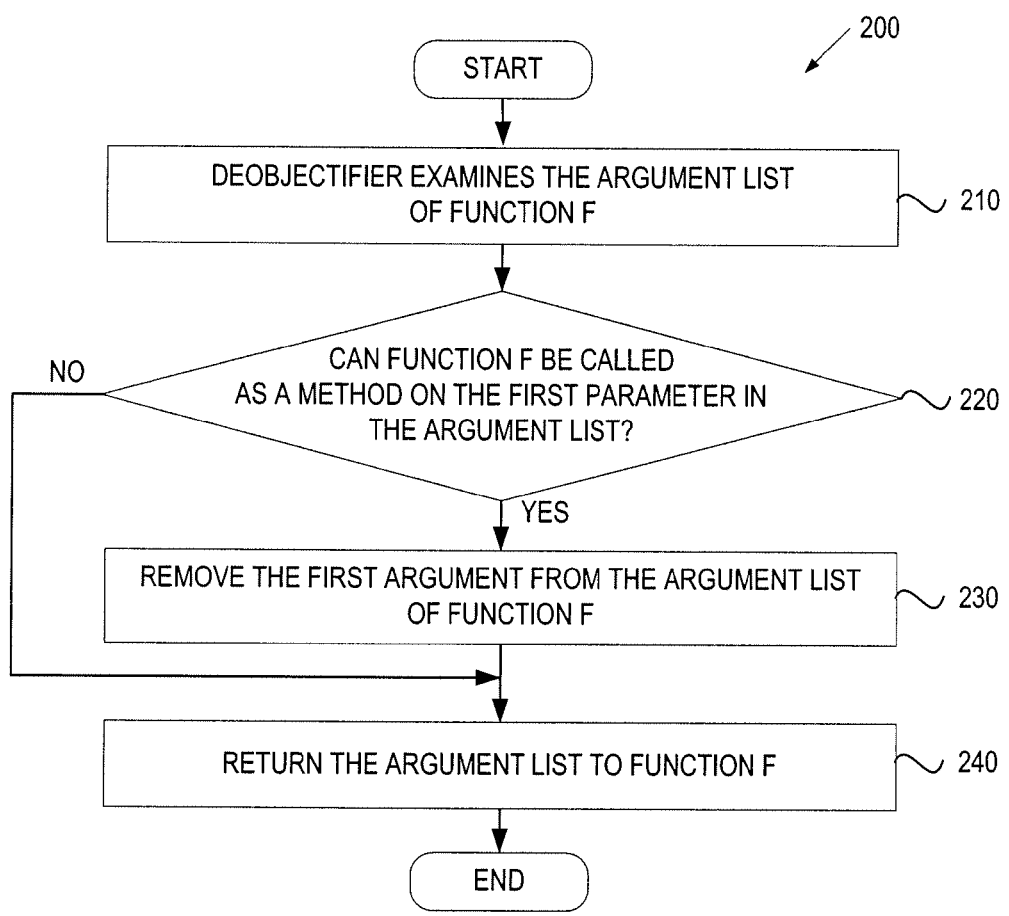
FIG. 2 is a flow diagram of one embodiment of a process that performs the operations of the deobjectifier of FIG. 1.

FIG. 2 illustrates a flow diagram of one embodiment of a process 200 for automatic instantiation of an object in a subroutine call. Process 200 may be performed by processing logic 426 of FIG. 4 that may comprise hardware (e.g., circuitry, dedicated logic, programmable logic, microcode, etc.), software (such as instructions run on a processing device), or a combination thereof. In one embodiment, process 200 is performed by the deobjectifier 110 on the computing system 100 of FIG. 1. Illustratively, process 200 is invoked when a function F is called with a subroutine call, and the function F, in turn, calls the deobjectifier 110 to ensure that the subroutine call is a function call. For this reason, the function F is referred to herein as the caller, of process 200. If it is detected that the subroutine call is a method call, the first object in the argument list is removed. By removing the object, process 200 thus converts the subroutine call into a function call. Process 200, if implemented as software, may be implemented in a programming language such as Perl.

Referring to FIG. 2, at block 210, process 200 begins with the deobjectifier 110 examining the function F that initiates process 200 (that is, F is the caller of the deobjectifier 110). Function F initiates process 200 in response to a subroutine call that calls function F with an argument list. In one embodiment, the entire or at least a portion of the argument list is passed to the deobjectifier 110, and the deobjectifier 110 examines the argument list to determine whether function F has been called as a method or as a function. At block 220, the deobjectifier 110 determines whether function F can be called as a method on a designated parameter (e.g., the first parameter) in the argument list. Some programming languages, e.g., Perl, make no distinction between a class and an object when they resolve method calls. Thus, function F can be called as a method on the first parameter if the first parameter is either an object or a class that has a method F. If such object or class exists, at block 230, the deobjectifier 110 removes the first parameter from the argument list of F and returns the shortened argument list to F at block 240. If, at block 220, it is determined that the function F cannot be called as a method on the first parameter in the argument list, process 200 proceeds to block 240 to return the unaltered argument list to function F. Process 200 terminates after the argument list is returned to function F.

FIG. 3 illustrates an example of a program written in Perl for implementing process 200 of FIG. 2. A Perl subroutine DeObjectify 300 performs the function of an embodiment of the deobjectifier 110 of FIG. 1 and process 200 of FIG. 2. In this example, DeObjectify 300 is called by a function foo 310 to ensure that foo 310 is called as a function. DeObjectify 300 includes a code segment 320 that retrieves the information of foo 310 including the name of foo 310. Code segment 320 utilizes an utility provided by Perl, which automatically saves the information of foo 310 and the caller of foo 310 in an internal stack. DeObjectify 300 also includes a code segment 330 to implement blocks 220 and 230 of process 200. Code segment 330 detects the presence of an object or a class in the first argument of the argument list passed from foo 310, and determines whether foo 310 can be called as a method on the first argument. If foo 310 can be called as a method on the first argument, code segment 330 shifts the argument list down by one, discarding the first argument.

In one embodiment, DeObjectify 300 and foo 310 can be part of a software library in which a plurality of functions (including foo 310) are provided. With DeObjectify 300, users of the software library may call the functions in the library with either function calls or method calls. This feature greatly improves software interoperability.

Figure 4:
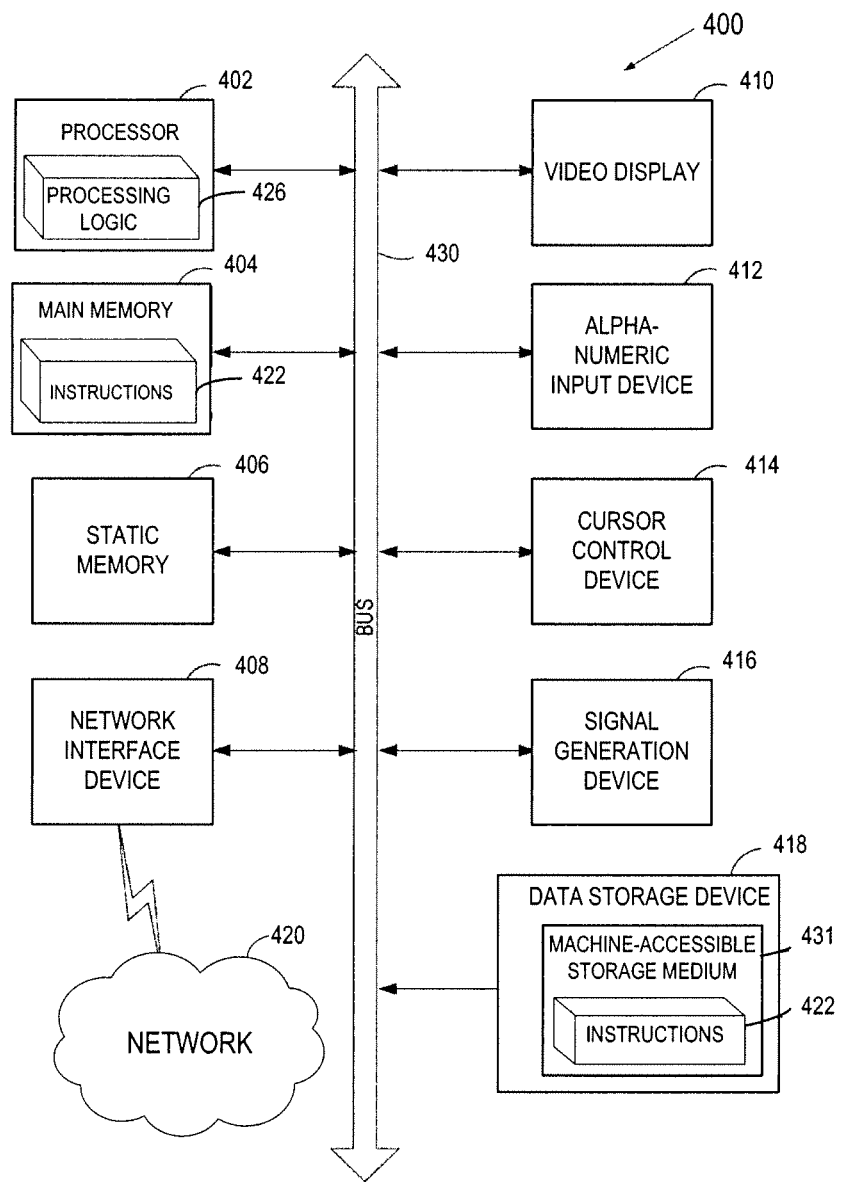
FIG. 4 illustrates a block diagram of an exemplary computer system implementing some embodiments of the present invention.

FIG. 4 illustrates a diagrammatic representation of a machine in the exemplary form of a computer system 400 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a device machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 400 includes a processor 402, a main memory 404 (e.g., read-only memory (ROM), flash memory, dynamic random access memory (DRAM) such as synchronous DRAM (SDRAM) or Rambus DRAM (RDRAM), etc.), a static memory 406 (e.g., flash memory, static random access memory (SRAM), etc.), and a secondary memory 418 (e.g., a data storage device), which communicate with each other via a bus 430.

Processor 402 represents one or more general-purpose processing devices such as a microprocessor, central processing unit, or the like. More particularly, the processor 402 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 402 may also be one or more special-purpose processing devices such as an application specific integrated circuit (ASIC), a field programmable gate array (FPGA), a digital signal processor (DSP), network processor, or the like. Processor 402 is configured to execute the processing logic 426 for performing the operations and steps discussed herein.

The computer system 400 may further include a network interface device 408. The computer system 400 also may include a video display unit 410 (e.g., a liquid crystal display (LCD) or a cathode ray tube (CRT)), an alphanumeric input device 412 (e.g., a keyboard), a cursor control device 414 (e.g., a mouse), and a signal generation device 416 (e.g., a speaker).

The secondary memory 418 may include a machine-readable storage medium (or more specifically a computer-readable storage medium) 431 on which is stored one or more sets of instructions (e.g., software 422) embodying any one or more of the methodologies or functions described herein. The software 422 may also reside, completely or at least partially, within the main memory 404 and/or within the processing device 402 during execution thereof by the computer system 400, the main memory 404 and the processing device 402 also constituting machine-readable storage media. The software 422 may further be transmitted or received over a network 420 via the network interface device 408.

The machine-readable storage medium 431 may also be used to store the deobjectifier 110 of FIG. 1, and/or a software library containing functions that call the deobjectifier 110. While the machine-readable storage medium 431 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present invention. The term "machine-readable storage medium" shall accordingly be taken to include, but not be limited to, solid-state memories, and optical and magnetic media.

Thus, a method and system for efficiently distributing data objects over a network have been described. It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A computer-implemented method comprising:
    invoking, by a computing device, a deobjectifier by a function that is passed an argument list;
    receiving, by the deobjectifier from the function, the argument list passed to the function, the argument list comprising a designated parameter to be analyzed by the deobjectifier;
    determining, by the deobjectifier, whether the designated parameter is at least one of an object or a class that can call the function as a method, the determining further comprising retrieving a name of the function from a stack that saves the name of the function;
    when the designated parameter is at least one of an object or a class that can call the function as a method:
        removing, by the deobjectifier, the designated parameter from the argument list; and
        returning, by the deobjectifier to the function, the argument list with the designated parameter removed, wherein the function proceeds as a called function based on the removal of the designated parameter from the argument list; and
    when the designated parameter is not at least one of an object or a class that can call the function as a method, returning the argument list back to the function in a same form as the argument list was received by the deobjectifier.

2. The computer-implemented method of claim 1, wherein the designated parameter is the first parameter in the argument list.

3. The computer-implemented method of claim 1, wherein the function and the deobjectifier are implemented in Perl.

4. The computer-implemented method of claim 1, further comprising:
incorporating the function into a software library; and
providing the software library and the deobjectifier to users to allow the function to be called as a method.

5. A system comprising:
a memory to store a software library comprising a plurality of functions;
a processing device communicably coupled to the memory; and
a deobjectifier executable from the memory by the processing device and invoked by a function of the plurality of functions that is passed an argument list, the deobjectifier to:
receive, from the function, the argument list, the argument list comprising a designated parameter to be analyzed by the deobjectifier;
determine whether the designated parameter is at least one of an object or a class that can call the function as a method, the determining further comprising retrieving a name of the function from a stack that saves the name of the function; and
when the designated parameter is at least one of an object or a class that can call the function as a method:
remove the designated parameter from the argument list; and
return, to the function, the argument list with the designated parameter removed, wherein the function proceeds as a called function based on the removal of the designated parameter from the argument list; and
when the designated parameter is not at least one of an object or a class that can call the function as a method, return the argument list back to the function in a same form as the argument list was received by the deobjectifier.

6. The system of claim 5, wherein the designated parameter is a first parameter of the argument list.

7. The system of claim 6, wherein the function and the deobjectifier are implemented in Perl.

8. The system of claim 5, wherein the deobjectifier is further to:
incorporate the function into a software library; and
provide the software library and the deobjectifier to users to allow the function to be called as a method.

9. A non-transitory computer readable storage medium including instructions that, when executed by a processing device, cause the processing device to perform operations comprising:
invoking, by the processing device, a deobjectifier by a function that is passed an argument list;
receiving, by the deobjectifier from the function, the argument list passed to the function, the argument list comprising a designated parameter to be analyzed by the deobjectifier;
determining, by the deobjectifier, whether the designated parameter is at least one of an object or a class that can call the function as a method, the determining further comprising retrieving a name of the function from a stack that saves the name of the function;
when the designated parameter is at least one of an object or a class that can call the function as a method:
removing, by the deobjectifier, the designated parameter from the argument list; and
returning, by the deobjectifier to the function, the argument list with the designated parameter removed, wherein the function proceeds as a called function based on the removal of the designated parameter from the argument list; and
when the designated parameter is not at least one of an object or a class that can call the function as a method, returning the argument list back to the function in a same form as the argument list was received by the deobjectifier.

10. The non-transitory computer readable storage medium of claim 9, wherein the designated parameter is a first parameter in the argument list.

11. The non-transitory computer readable storage medium of claim 9, wherein the function and the deobjectifier are implemented in Perl.

12. The non-transitory computer readable storage medium of claim 9, wherein the operations further comprise:
incorporating the function into a software library; and
providing the software library and the deobjectifier to users to allow the function to be called as a method.

\* \* \* \* \*